United States Patent
Wakao

(10) Patent No.: US 7,681,049 B2
(45) Date of Patent: Mar. 16, 2010

(54) IMAGING APPARATUS

(75) Inventor: Satoru Wakao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 998 days.

(21) Appl. No.: 10/606,313

(22) Filed: Jun. 26, 2003

(65) Prior Publication Data

US 2005/0091497 A1 Apr. 28, 2005

(30) Foreign Application Priority Data

Jul. 1, 2002 (JP) ............... 2002-192107

(51) Int. Cl.
*G06F 7/04* (2006.01)
(52) U.S. Cl. ............... 713/194; 713/187; 726/30
(58) Field of Classification Search ............ 726/26–30; 713/187, 194; 380/287
See application file for complete search history.

(56) References Cited

U.S. PATENT DOCUMENTS

| | | | |
|---|---|---|---|
| 5,499,294 A | | 3/1996 | Friedman |
| 6,968,058 B1 * | | 11/2005 | Kondoh et al. .............. 380/200 |
| 7,000,112 B1 | | 2/2006 | Oishi |
| 7,047,418 B1 * | | 5/2006 | Ferren et al. ................ 713/186 |
| 2002/0060736 A1 | | 5/2002 | Wakao et al. |
| 2002/0184539 A1 * | | 12/2002 | Fukuda et al. .............. 713/202 |
| 2003/0012644 A1 | | 1/2003 | Dodd |
| 2003/0123699 A1 | | 7/2003 | Wakao et al. |
| 2003/0123700 A1 | | 7/2003 | Wakao |
| 2003/0126443 A1 | | 7/2003 | Wakao |

FOREIGN PATENT DOCUMENTS

JP    09-200730    7/1997

* cited by examiner

*Primary Examiner*—Kimyen Vu
*Assistant Examiner*—Edward Zee
(74) *Attorney, Agent, or Firm*—Fitzpatrick, Cella, Harper & Scinto

(57) ABSTRACT

An imaging apparatus includes an image data generating unit, an authentication data generating unit, a receiving unit and an authentication unit. The image data generating unit generates first image data. The authentication data generating unit generates first authentication data from the first image data. The receiving unit receives second image data and second authentication data from an external device, wherein both the second image data and the second authentication data are generated by a second imaging apparatus, and the second authentication data is generated from the second image data. The authentication unit has (a) a first authentication mode where the authentication unit authenticates, using the first authentication data, whether the first image data has been altered, and (b) a second authentication mode where the authentication unit authenticates, using the second authentication data, whether the second image data has been altered.

11 Claims, 5 Drawing Sheets

IMAGING APPARATUS

FIELD OF THE INVENTION

The present invention relates to an apparatus having a function of authenticating if image data has not been altered.

BACKGROUND OF THE INVENTION

Some imaging apparatuses such as a digital camera and the like have a function of generating authentication data, which is used to authenticate if image data has not been altered, together with that image data.

However, in a conventional imaging apparatus with that function, it cannot be authenticated if image data generated by the self apparatus or the other apparatus has not been altered, unless a special apparatus is prepared.

The present invention has been made in consideration of the above problem, and has as its object to authenticate if image data generated by the self apparatus or the other apparatus has not been altered, without preparing for any special apparatus.

SUMMARY OF THE INVENTION

In order to achieve the above object, for example, an imaging apparatus of the present invention comprises the following arrangement.

That is, an imaging apparatus having a function of authenticating if image data generated by a self apparatus has not been altered, and a function of authenticating if image data generated by the other apparatus has not been altered.

In order to achieve the above object, for example, an imaging apparatus of the present invention comprises the following arrangement.

That is, an imaging apparatus having a first mode of generating image data, and generating authentication data used to authenticate if the image data has not been altered, and a second mode of authenticating if the image data has not been altered, using the authentication data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Preferred embodiments of the present invention will now be described in detail in accordance with the accompanying drawings.

The arrangement of an imaging apparatus 10 according to an embodiment of the present invention will be described first with reference to the block diagram of FIG. 1. An imaging apparatus 10 need only be an apparatus which has a function of generating digital image data of an object and its additional data. Therefore, the imaging apparatus 10 can be any of a digital still camera, digital video camera, and scanner.

Figure 1:
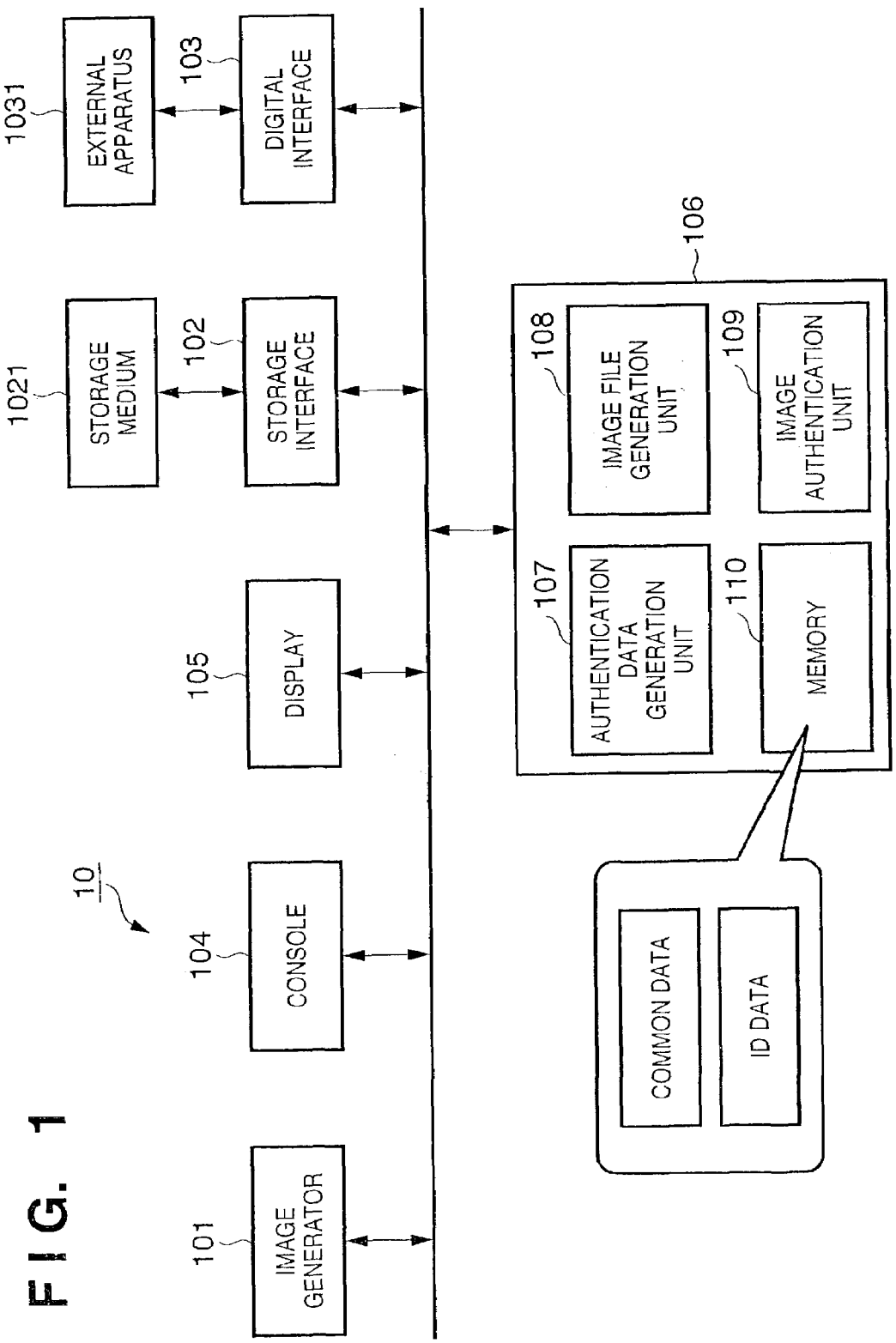
FIG. 1 is a block diagram showing the arrangement of an imaging apparatus according to an embodiment of the present invention.

The imaging apparatus 10 comprises an image generator 101, storage interface 102, digital interface 103, console 104, display 105, and controller 106, as shown in FIG. 1.

The image generator 101 has a function of generating digital image data of an object and its additional data.

The storage interface 102 has a function of writing an image file in a storage medium 1021 as a removable storage medium, and a function of reading an image file from the storage medium 1021. Note that the storage medium 1021 can store not only image files generated by the imaging apparatus 10 but also those generated by apparatuses other than the imaging apparatus 10.

The digital interface 103 can digitally communicate with an external apparatus 1031. The digital interface 103 has a function of writing an image file held by the storage medium 1021 in the external apparatus 1031, and a function of reading an image file held by the external apparatus 1031 from it. The image file read from the external apparatus 1031 is written in the storage medium 1021.

The console 104 is means for accepting user's instructions, and has a shutter button used to instruct generation of image data, a mode select button used to switch the operation mode of the imaging apparatus 10 to a predetermined mode, and the like.

The display 105 displays thumbnail data of image data generated by the image generator 101, or that in an image file read out from the storage medium 1021 or external apparatus 1031.

The controller 106 controls various functions of the imaging apparatus 10. The controller 106 has an authentication data generation unit 107, image file generation unit 108, image authentication unit 109, and memory 110, as shown in FIG. 1.

The authentication data generation unit 107 has a function of generating authentication data as data used to authenticate if image data has not been altered.

Figure 2:
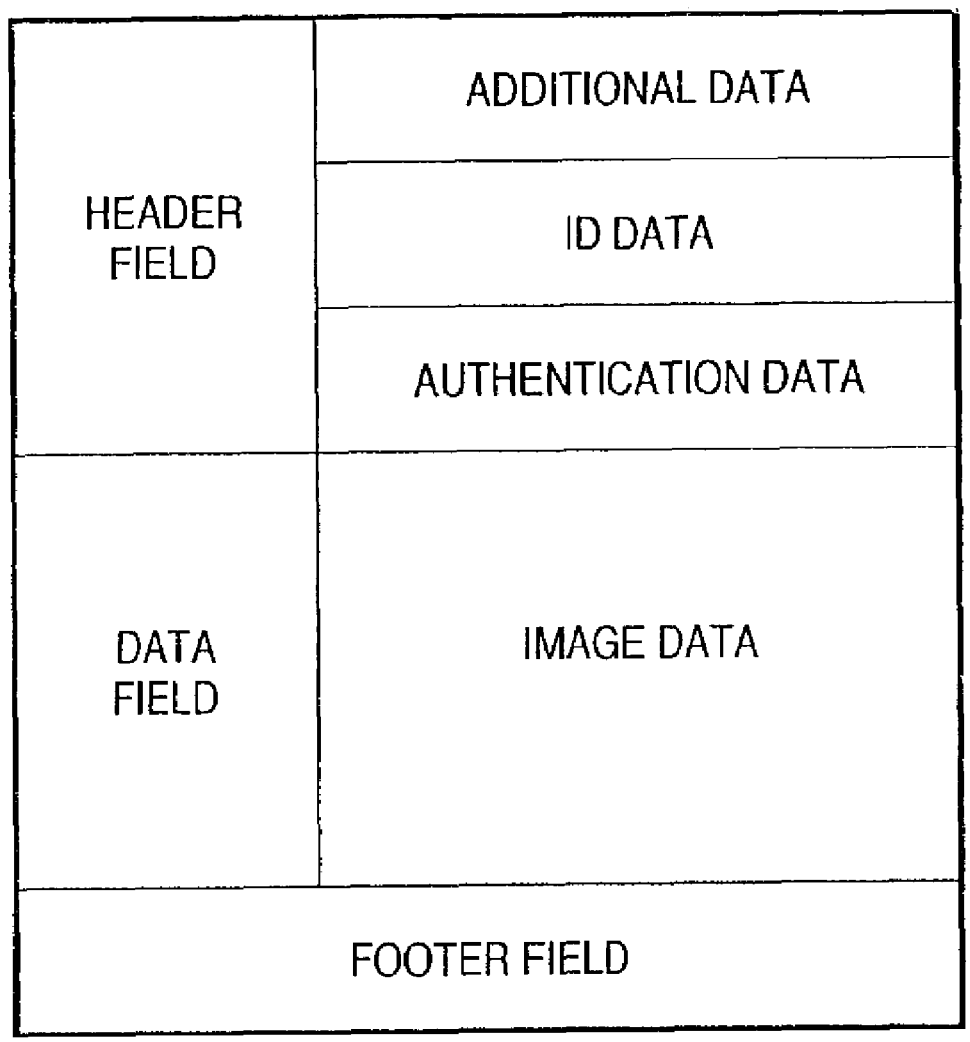
FIG. 2 shows an example of an image file with authentication data.

The image file generation unit 108 has a function of generating an image file with authentication data. FIG. 2 shows an example of an image file with authentication data. As shown in FIG. 2, the image file with authentication data contains image data generated by the image generator 101, additional data and authentication data of that image data, and ID data unique to the imaging apparatus 10. In this embodiment, the authentication data and ID data are stored in a header field. Alternatively, these data may be stored in a data field or footer field in place of the header field.

The image authentication unit 109 has a function of authenticating if image data in an image file generated by the imaging apparatus 10 or the other imaging apparatus has not been altered.

The memory 110 stores common data and ID data. The common data and ID data in the memory 110 are important ones which are required upon generation of authentication data of image data. Especially, the common data must be securely managed so as not to externally leak. The common data in the memory 110 is common to a plurality of imaging apparatuses including the imaging apparatus 10, and is the same data in all the imaging apparatuses. On the other hand, the ID data in the memory 110 is unique to one imaging apparatus, and is different for respective imaging apparatuses.

Figure 3:
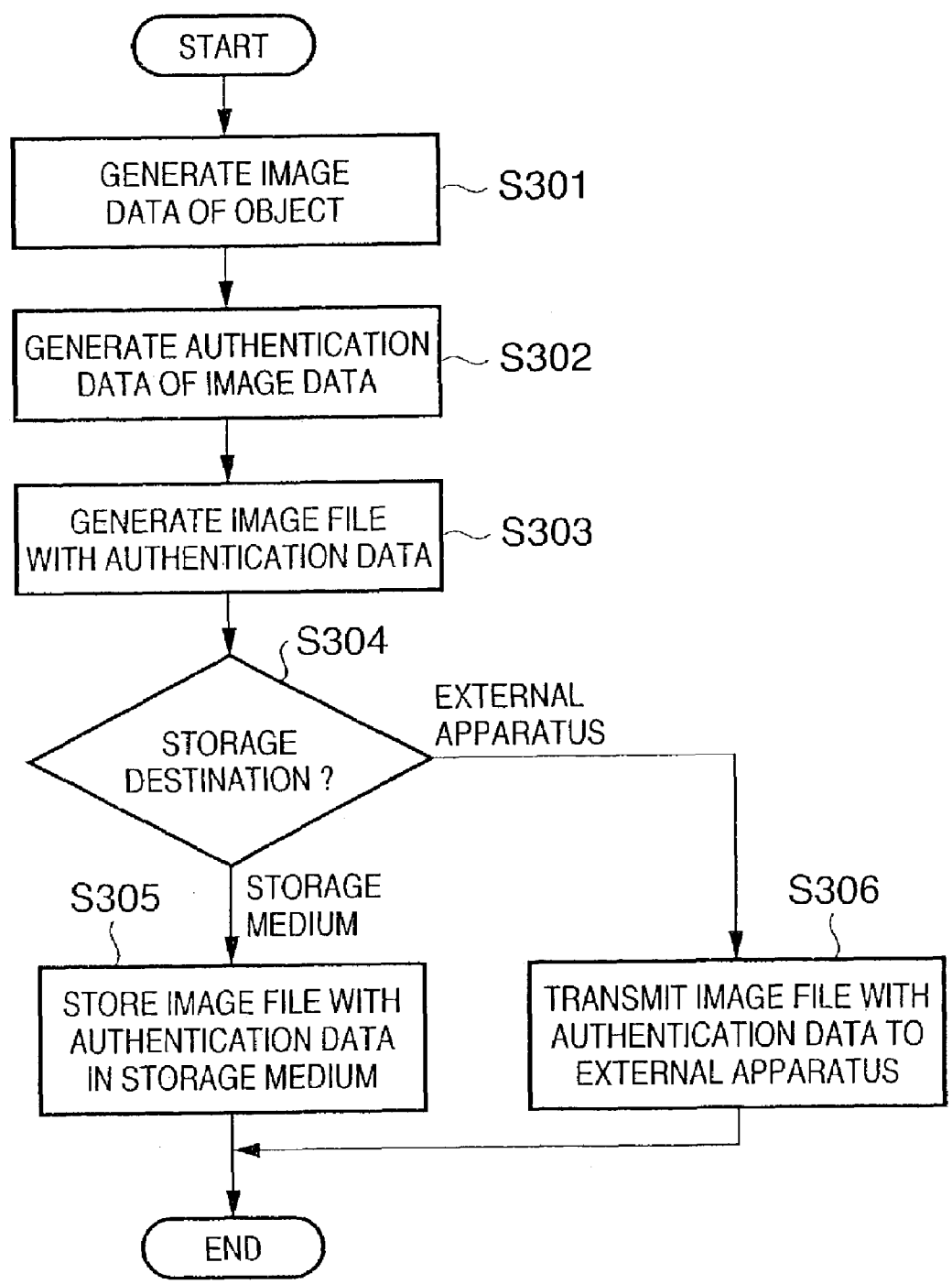
FIG. 3 is a flow chart showing the processing sequence executed in a photographing mode with an authentication function.

The processing sequence executed when the operation mode of the imaging apparatus 10 of this embodiment is a photographing mode with an authentication function will be described below with reference to the flow chart of FIG. 3. In the photographing mode with the authentication function, the imaging apparatus 10 can generate an image file with authentication data.

Step S301: When the user has pressed the shutter button of the console 104, the image generator 101 generates digital image data of an object and its additional data.

Step S302: The authentication data generation unit 107 generates authentication data as data used to authenticate alteration of the image data generated by the image generator 101 using that image data. The method of generating this authentication data will be described later with reference to the flow chart of FIG. 4.

Step S303: The image file generation unit 108 generates an image file with authentication data, which contains the image data generated by the image generator 101, the additional data and authentication data of that image data, and the ID data of the imaging apparatus 10. Note that the additional data, ID data, and authentication data are stored in the header field of the image file, as shown in FIG. 2.

Step S304: The controller 106 determines a storage destination of the image file with authentication data, which is generated by the image file generation unit 108. If the storage destination of the image file with authentication data is the storage medium 1021, a process in step S305 is executed; if it is the external apparatus 1031 such as a personal computer or the like, a process in step S306 is executed.

Step S305: The controller 106 writes the image file with authentication data generated by the image file generation unit 108 in the storage medium 1021.

Step S306: The controller 106 writes the image file with authentication data generated by the image file generation unit 108 in the external apparatus 1031.

With the above processes, the imaging apparatus 10 can generate an image file with authentication data when the operation mode of the self apparatus is the photographing mode with the authentication function, and can store the generated image file in the storage medium 1021 or external apparatus 1031.

Figure 4:
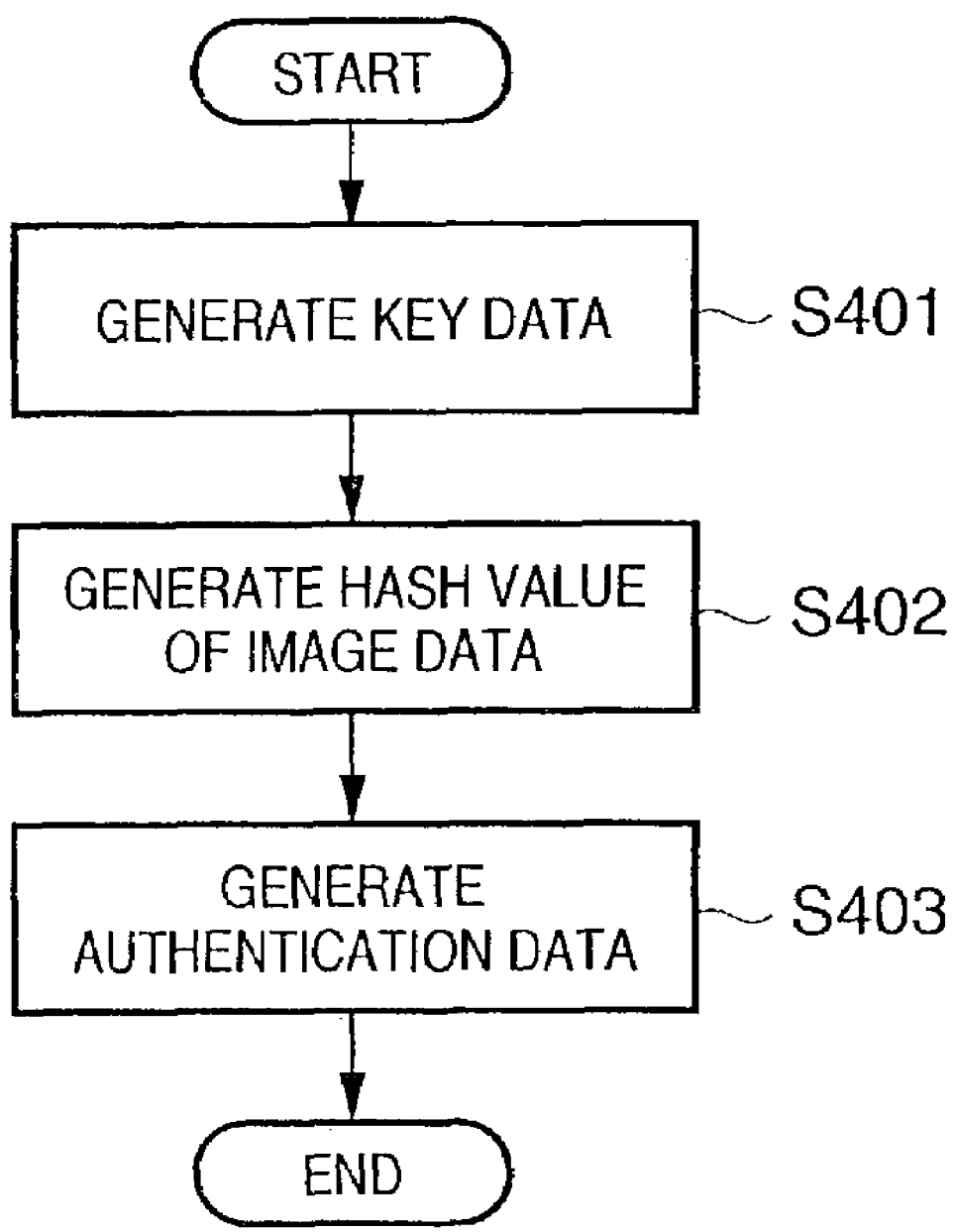
FIG. 4 is a flow chart showing the processing sequence for generating authentication data.

The processing sequence for generating authentication data which is used to authenticate if image data generated by the image generator 101 has not been altered, on the basis of that image data, will be described below with reference to the flow chart of FIG. 4.

Step S401: The authentication data generation unit 107 generates key data by executing a first arithmetic process using the common data and ID data read out from the memory 110. This embodiment adopts a method of generating key data using both the common data and ID data in place of generating key data using the ID data alone. With this method, it becomes difficult to analyze key data and to counterfeit authentication data, and the system security can be improved.

Step S402: The authentication data generation unit 107 generates a hash value (also called a message digest or digest data) of the image data generated by the image generator 101 from that image data.

Step S403: The authentication data generation unit 107 generates authentication data by executing a second arithmetic process using the key data obtained in step S401 and the hash value obtained in step S402. Note that the second arithmetic process can exploit, e.g., an arithmetic operation based on a predetermined common key cipher system, an arithmetic operation based on a hash function with a key, and the like.

With the aforementioned processes, the imaging apparatus 10 can securely generate authentication data which is used to authenticate if image data generated by the image generator 101 has not been altered, on the basis of that image data.

Figure 5:
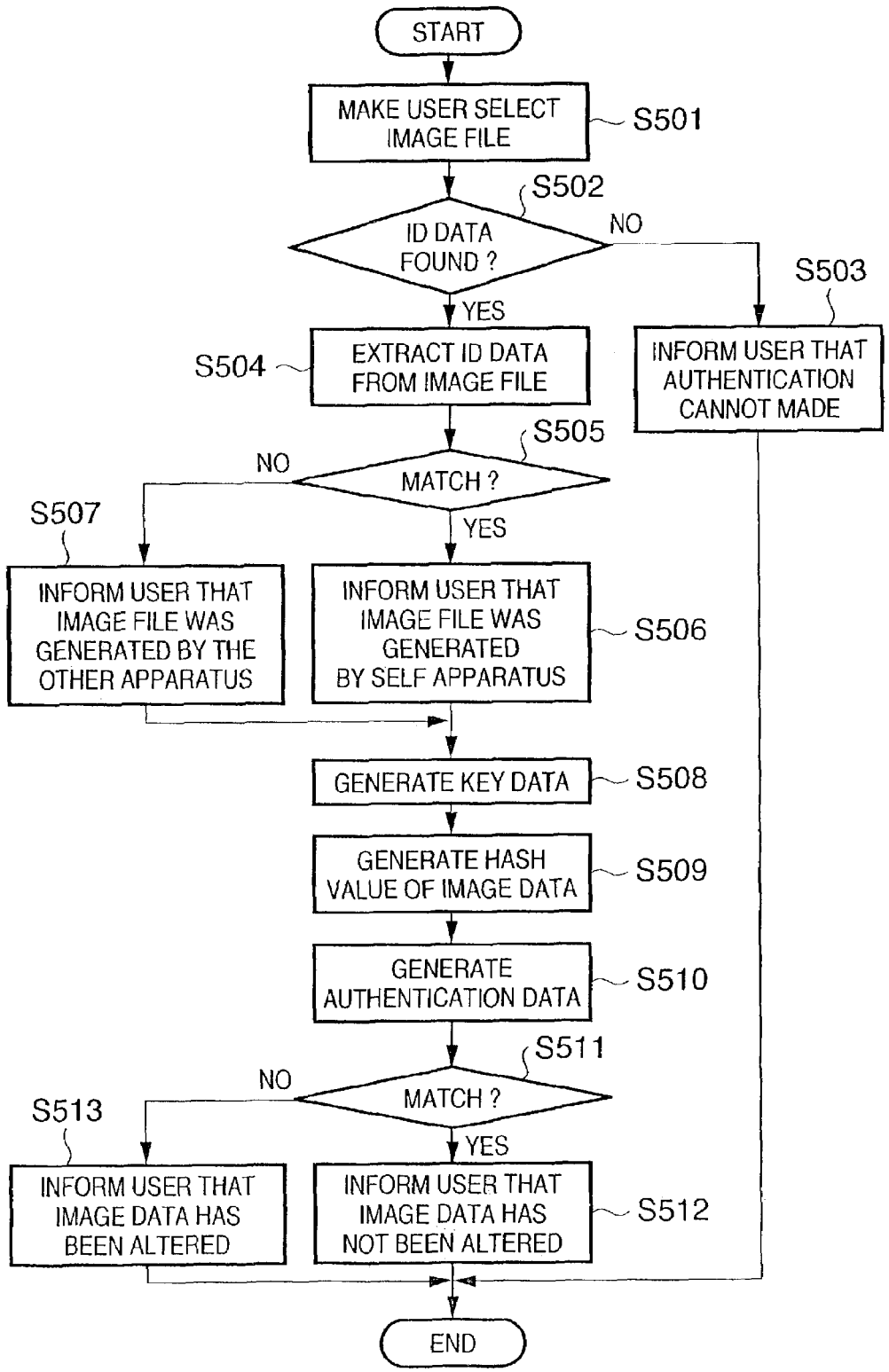
FIG. 5 is a flow chart showing the processing sequence executed in an authentication mode.

The processing sequence executed when the operation mode of the imaging apparatus 10 is an authentication mode will be described below with reference to the flow chart of FIG. 5. If the authentication mode is set, the imaging apparatus 10 can authenticate if image data generated by the imaging apparatus 10 or the other apparatus (including the external apparatus 1031) has not been altered.

Step S501: The controller 106 makes the user select one of image files stored in the storage medium 1021 or external apparatus 1031. The user selects a desired image file by operating the console 104. The storage interface 102 or digital interface 103 reads an image file of user's choice, and supplies the read image file to the image authentication unit 109.

Step S502: The image authentication unit 109 checks if the image file selected by the user contains ID data. If the ID data is found, a process in step S504 is executed; otherwise, a process in step S503 is executed.

Step S503: In this case, the controller 106 displays, on the display 105, a message or icon indicating that whether or not the image file has been altered cannot be authenticated, and advises the user accordingly.

Step S504: The image authentication unit 109 extracts ID data from the image file of user's choice.

Step S505: The image authentication unit 109 compares the ID data extracted in step S504 with the ID data stored in the memory 110. The ID data extracted in step S504 is unique to an apparatus that generated the image file of user's choice. Therefore, if the two ID data match, it is determined that the image file of user's choice was generated by the imaging apparatus 10. On the other hand, if the two ID data do not match, it is determined that the image file of user's choice was generated by an apparatus other than the imaging apparatus 10.

Step S506: If the two ID data match, the controller 106 displays, on the display 105, a message or icon indicating that the image file of user's choice was generated by the self apparatus, and advises the user accordingly.

Step S507: On the other hand, if the two ID data do not match, the controller 106 displays, on the display 105, a message or icon indicating that the image file of user's choice was not generated by the self apparatus, and advises the user accordingly.

Step S508: The image authentication unit 109 generates key data by reading out the common data from the memory 110 and executing the first arithmetic process using the read-out common data and the ID data obtained in step S504. This process is the same as that executed in step S401 in FIG. 4.

Step S509: The image authentication unit 109 extracts image data from the image file of user's choice, and generates a hash value of the image data from the extracted image data. This process is the same as that executed in step S402 in FIG. 4.

Step S510: The image authentication unit 109 generates authentication data by executing the second arithmetic process using the key data obtained in step S508 and the hash value obtained in step S509. This process is the same as that executed in step S403 in FIG. 4.

Step S511: The image authentication unit 109 compares the authentication data extracted from the image file of user's choice, and the authentication data obtained in step S510 to authenticate whether or not the image data in that image file has been altered.

Step S512: If the two authentication data match, the image authentication unit 109 determines that the image data in the image file of user's choice has not been altered. In this case, the controller 106 displays, on the display 105, a message or icon indicating that the image data has not been altered, and advises the user accordingly.

Step S513: If the two authentication data do not match, the image authentication unit 109 determines that the image data in the image file of user's choice has been altered. In this case, the controller 106 displays, on the display 105, a message or icon indicating that the image data has been altered, and advises the user accordingly.

As described above, the imaging apparatus 10 according to this embodiment can authenticate whether or not image data generated by the self apparatus has been altered, and can also authenticate whether or not image data generated by the other apparatus has been altered. Therefore, the presence/absence of alteration can be easily authenticated without preparing for any special apparatus.

Also, the imaging apparatus 10 according to this embodiment can detect whether the image file of user's choice is generated by the self apparatus or the other apparatus, and can advise the user accordingly.

Note that the present invention can be practiced in various forms without departing from its principal feature. Therefore, the present invention should not be limited to the above embodiment.

According to the present invention, whether or not image data generated by the self apparatus the other apparatus has not been altered and whether or not image data generated by the other apparatus has not been altered can be authenticated.

As many apparently widely different embodiments of the present invention can be made without departing from the spirit and scope thereof, it is to be understood that the invention is not limited to the specific embodiments thereof except as defined in the claims.

What is claimed is:

1. A first imaging apparatus comprising:
an image data generating unit which generates first image data;
an authentication data generating unit which generates first authentication data from the first image data;
a receiving unit which receives second image data and second authentication data from an external device, wherein both the second image data and the second authentication data are generated by a second imaging apparatus, the second imaging apparatus is different from the first imaging apparatus, and the second authentication data is generated from the second image data;
an authentication unit which has (a) a first authentication mode where said authentication unit authenticates, using the first authentication data, whether the first image data has been altered, and (b) a second authentication mode where said authentication unit authenticates, using the second authentication data, whether the second image data has been altered; and
a display unit which (a) displays information indicating that the first image data was generated by the first imaging apparatus, if said authentication unit authenticates whether the first image data has been altered and (b) displays information indicating that the second image data was not generated by the first imaging apparatus, if said authentication unit authenticates whether the second image data has been altered.

2. The first imaging apparatus according to claim 1, wherein said authentication data generating unit generates the first authentication data using data unique to the first imaging apparatus.

3. The first imaging apparatus according to claim 1, wherein said authentication data generating unit generates the first authentication data using secret data held by the first imaging apparatus.

4. The first imaging apparatus according to claim 1, wherein said authentication data generating unit generates the first authentication data using a hash function.

5. The first imaging apparatus according to claim 1, wherein said authentication data generating unit generates the first authentication data using a common key cipher.

6. The first imaging apparatus according to claim 1, wherein said authentication unit authenticates, using data unique to the second imaging apparatus, whether the second image data generated by the second imaging apparatus has been altered.

7. The first imaging apparatus according to claim 1, wherein said authentication unit authenticates, using secret data held by the first imaging apparatus, whether the second image data generated by the second imaging apparatus has been altered.

8. The first imaging apparatus according to claim 1, wherein said authentication unit authenticates, using a hash function, whether the second image data generated by the second imaging apparatus has been altered.

9. The first imaging apparatus according to claim 1, wherein said authentication unit authenticates, using a common key cipher, whether the second image data generated by the second imaging apparatus has been altered.

10. The first imaging apparatus according to claim 1, wherein the first imaging apparatus is one of a digital camera, a digital video camera, and a scanner.

11. The first imaging apparatus according to claim 1, further comprising:
a storage interface unit which stores the first image data with the first authentication data in a removable storage medium, and stores the second image data with the second authentication data in the removable storage medium.

* * * * *